Figure 2:
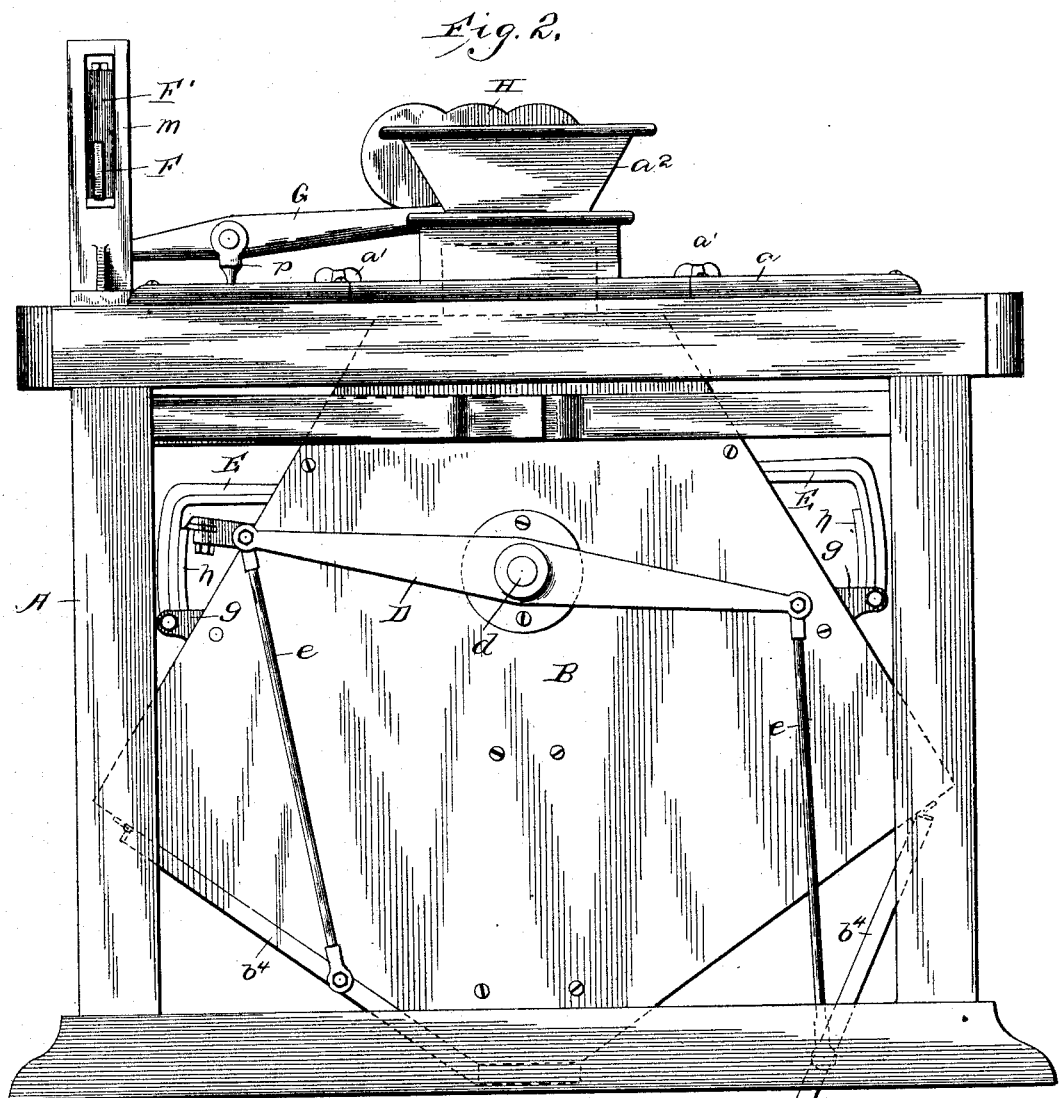

No. 618,983. Patented Feb. 7, 1899.
J. DORIOT.
FLOUR OR GRAIN SCALE.
(Application filed Apr. 8, 1898.)
(No Model.) 6 Sheets—Sheet 1.
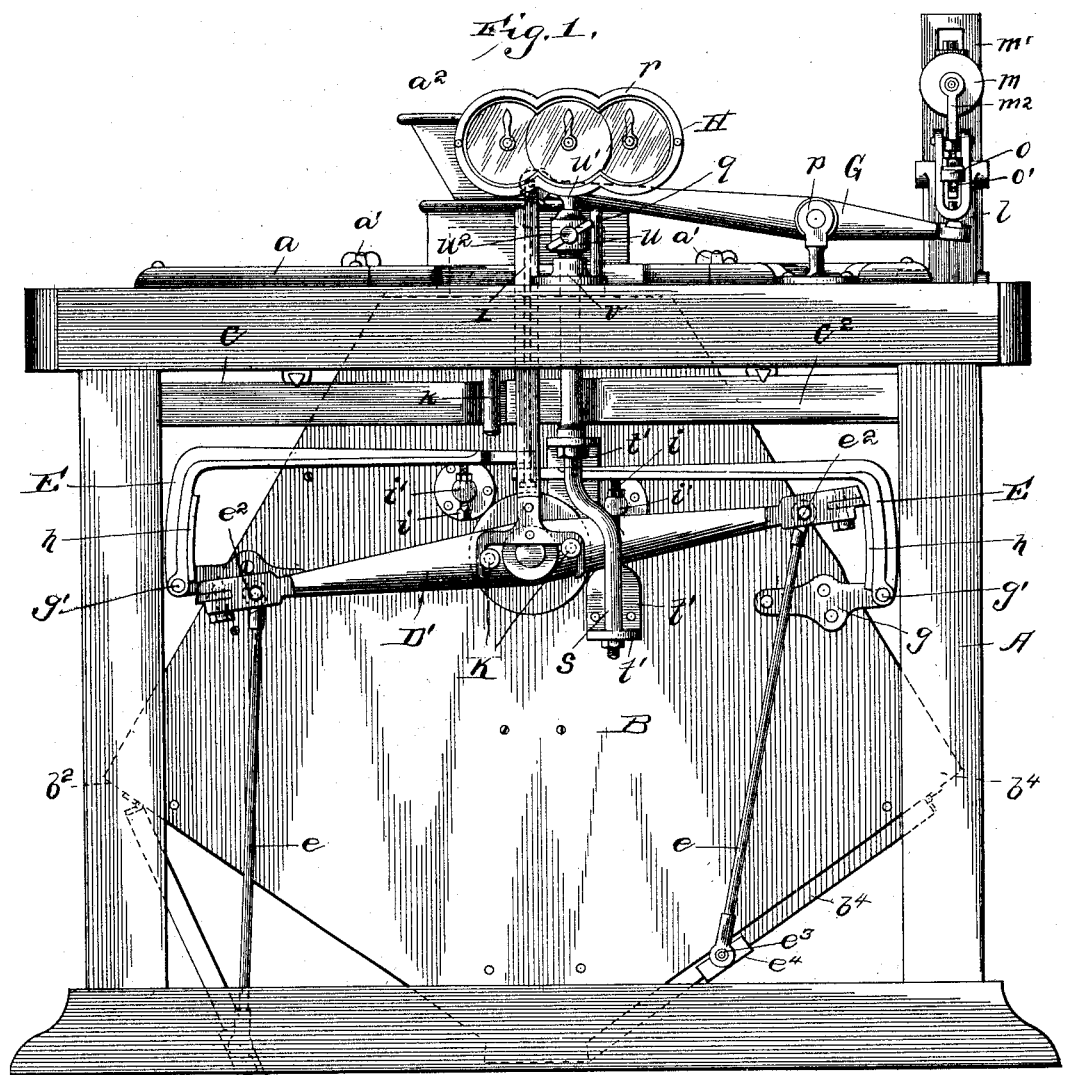
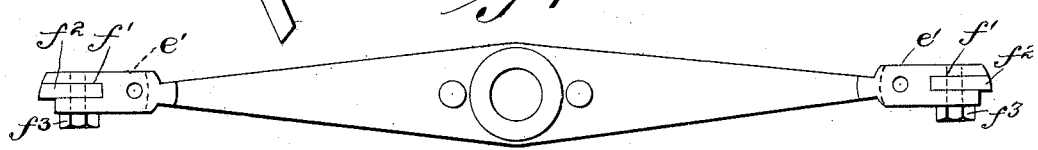

No. 618,983. Patented Feb. 7, 1899.
J. DORIOT.
FLOUR OR GRAIN SCALE.
(Application filed Apr. 8, 1898.)
(No Model.) 6 Sheets—Sheet 2.

Witnesses
Wm H. Edwards Jr.
J. W. Mothershead

Inventor
Julian Doriot
By Edson Bro's
Attorneys

No. 618,983. Patented Feb. 7, 1899.
J. DORIOT.
FLOUR OR GRAIN SCALE.
(Application filed Apr. 8, 1898.)
(No Model.) 6 Sheets—Sheet 3.
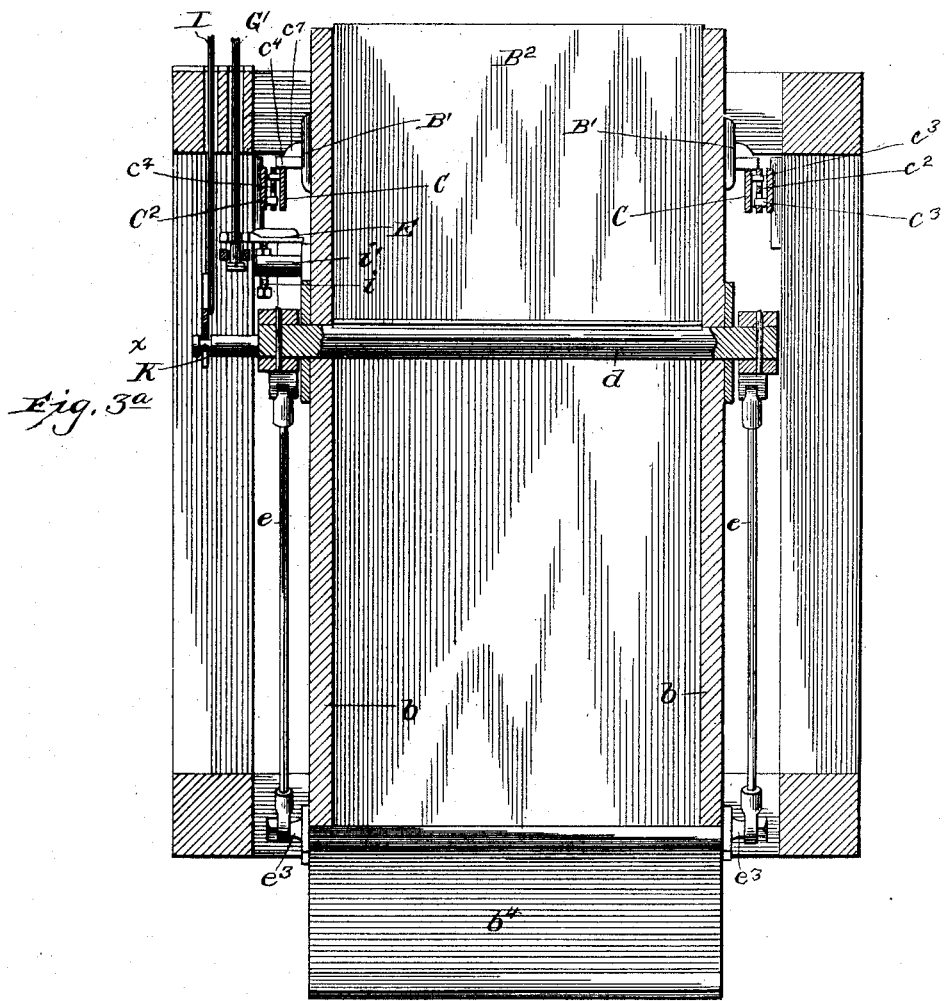
Fig. 3ª
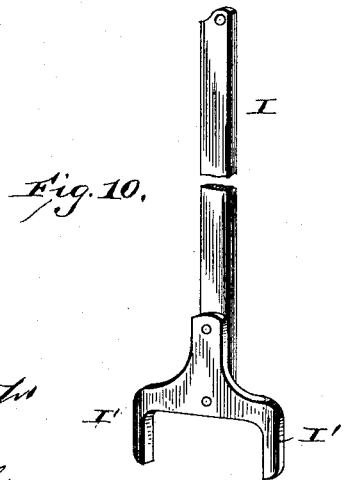
Fig. 10.

No. 618,983. Patented Feb. 7, 1899.
J. DORIOT.
FLOUR OR GRAIN SCALE.
(Application filed Apr. 8, 1898.)
(No Model.) 6 Sheets—Sheet 4.
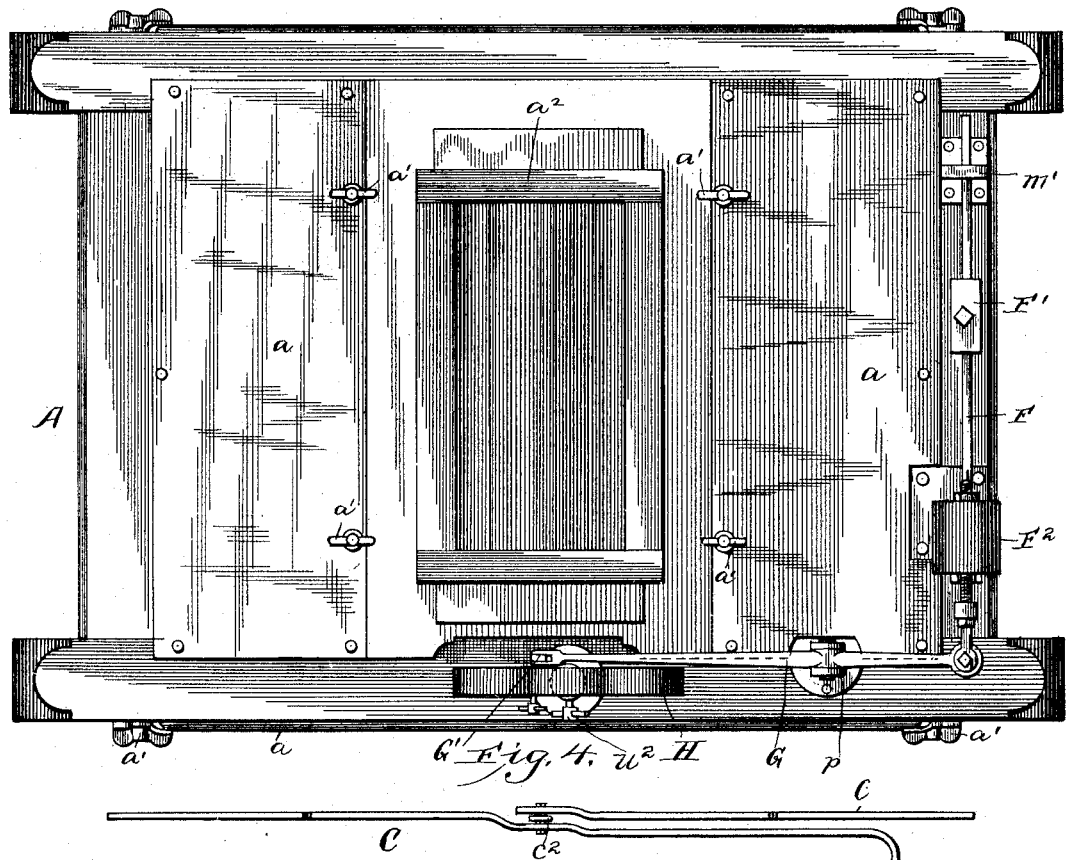

No. 618,983. Patented Feb. 7, 1899.
J. DORIOT.
FLOUR OR GRAIN SCALE.
(Application filed Apr. 8, 1898.)
(No Model.) 6 Sheets—Sheet 5.

No. 618,983. Patented Feb. 7, 1899.
J. DORIOT.
FLOUR OR GRAIN SCALE.
(Application filed Apr. 8, 1898.)
(No Model.) 6 Sheets—Sheet 6.

Witnesses
Wm H. Edwards Jr.

Inventor
Julian Doriot
By Edson Bro's,
Attorneys.

UNITED STATES PATENT OFFICE.

JULIAN DORIOT, OF BLUFFTON, OHIO.

FLOUR OR GRAIN SCALE.

SPECIFICATION forming part of Letters Patent No. 618,983, dated February 7, 1899.

Application filed April 8, 1898. Serial No. 676,952. (No model.)

*To all whom it may concern:*

Be it known that I, JULIAN DORIOT, a citizen of the United States, residing at Bluffton, in the county of Allen and State of Ohio, have invented certain new and useful Improvements in Flour or Grain Scales; and I do hereby declare the following to be a full, clear, and exact description of the invention, such as will enable others skilled in the art to which it appertains to make and use the same.

My invention relates to improvements in flour or grain scales, more especially that class which automatically weigh and discharge the grain or material.

It has for its object, among other things, to greatly simplify the construction and operation of the machine and to secure direct and positive action of the parts and accuracy in weighing; also, to render the machine automatic in operation and to effect the alternate opening and closing of the discharge ends of the grain-receptacle compartments or chambers to provide for the continuous feeding of the grain or material.

It consists of tripping and actuating mechanism for the hinged bottoms or gates at the lower or discharge ends of the compartments or chambers of the grain-receptacle adapted to be primarily tripped or operated from the scale or counterpoise beam and an intermediary forked push-bar engaged by preferably trunnion-like projections or studs on said valve-actuating lever; of lever and lifting rod or bar mechanism interposed between and acted upon by said scale or counterpoise beam and connected to said tripping mechanism; of grain-receptacle knife-edge supporting bars or levers in turn having knife-edged pivot-bearings and themselves having knife-edged connections and connected to said scale or counterpoise beam, and of peculiarly-constructed registering mechanism, substantially as hereinafter more fully disclosed, and specifically pointed out in the claims.

The scope of my invention, it will be understood, extends to the generic features hereinbefore outlined and will not be restricted by details as to the construction and arrangement of the parts.

Figure 8:
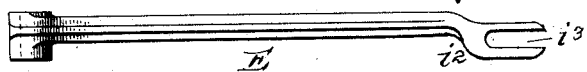
Figure 5:
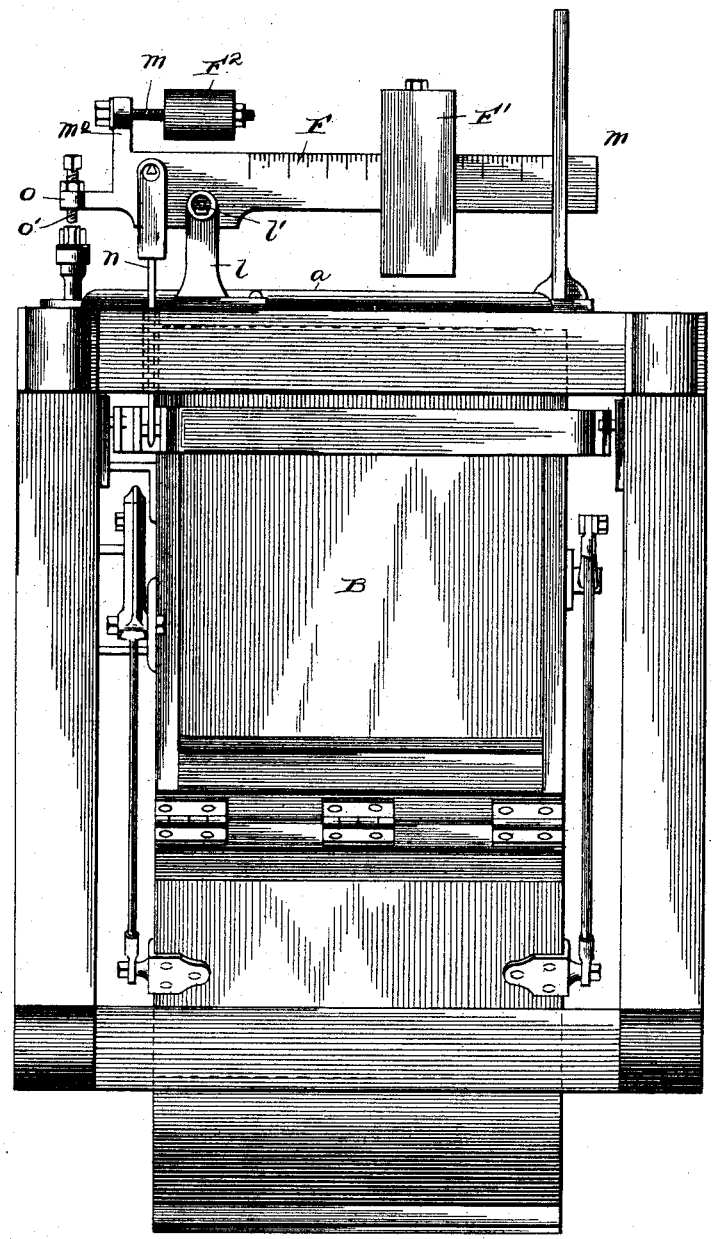
Figure 3:
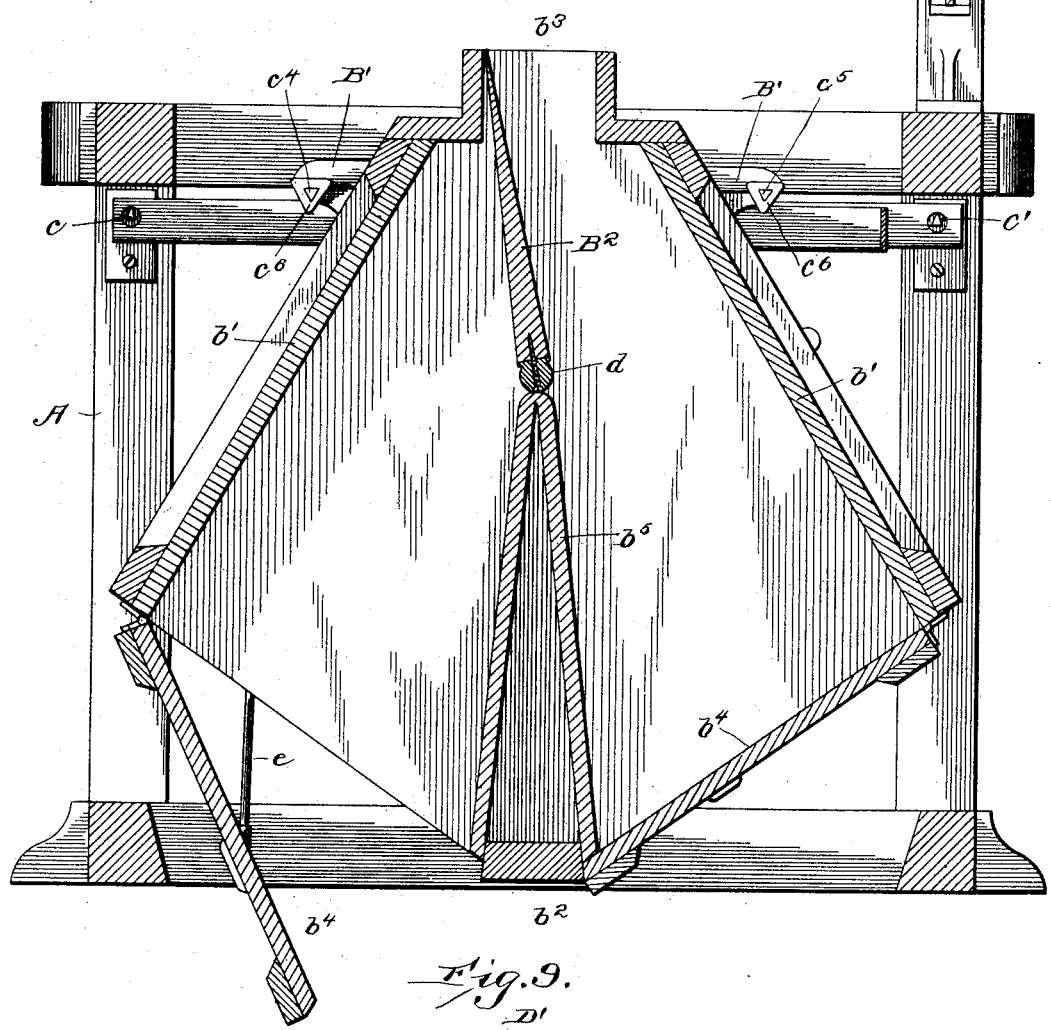
Figure 9:
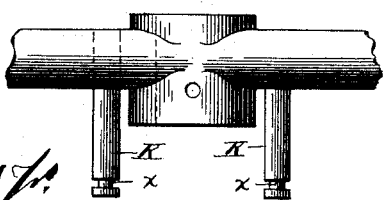

In the accompanying drawings, illustrating the preferred form of carrying out my invention, Figure 1 is a side elevation thereof. Fig. 2 is an opposite side view of the same. Fig. 3 is a vertical longitudinal section thereof. Fig. 3$^a$ is a vertical cross-section. Fig. 4 is a plan view, and Fig. 5 is an end elevation, showing principally the scale or counterpoise beam mechanism. Fig. 6 is a detailed view of the grain-receptacle knife-edge supporting bars or levers. Figs. 7 and 8 are detailed views of one of the grain-receptacle valve-levers and of one of the trips or dogs therefor, respectively. Fig. 8$^a$ is a side view of said trip or dog. Fig. 9 is a broken-away view showing chiefly the trunnion-like studs or projections of the aforesaid grain-receptacle valve-lever, and Fig. 10 is a detached view of the forked or bifurcated register-actuating bar or rod.

A is a framing to which preferably removable top, sides, and ends $a$ are applied, the same being held in place by thumb or swivel buttons $a'$ on said framing, the whole forming a closure or casing, and upon this casing is secured a hopper $a^2$ for feeding the grain to the receptacle B.

The receptacle B is preferably provided with parallel sides $b$ and ends $b'$, inclined from their upper edges downward and outward to their lower edges, and from said lower edges it is inclined downward and inward to a central point, as at $b^2$. Said receptacle is also provided with an upward extension $b^3$ around its mouth or feed-opening, fitting snugly within a lower end lateral extension of the hopper $a^2$, and to the upper portions of the inclined bottom edges $b^2$ of said receptacle are hinged gates or the bottoms proper, $b^4$, presently further referred to.

The receptacle B is yieldingly or depressibly hung in position upon preferably edgewise-disposed bars or levers C C' C$^2$, one bar or lever C substantially bail-like in form, with its free ends adapted to be knife-edge supported or pivoted, as at $c$, upon the framing A and adapted to be connected to the counterpoise or scale beam, as explained later on. The other or lateral bars or levers C' C$^2$ are also preferably knife-edge supported or pivoted, as at $c'$ $c'$, at their free ends upon the framing A at the opposite end of the casing or closure and are connected at their opposite ends to the bail-like lever C by links $c^2$, also having knife supports or bearings, as at $c^3$, upon said levers or bars C C' C$^2$, respectively.

The lever or bail C is crooked or bent laterally about at its mid-length to provide for the convenient arrangement and attachment therewith of the levers C' C$^2$, said latter levers also being slightly crooked or bent similarly opposite said points of attachment to aid that purpose.

The receptacle B has secured to its opposite parallel sides hangers or castings B', preferably two to each side near the top, having, preferably, lateral knife-edge bearings or pivots $c^4\ c^4\ c^5\ c^5$, the former (one at each side of the receptacle) resting upon the lever or bail C and the latter resting upon the bars or levers C' C², thus, as before intimated, permitting of the yielding or depressing of the receptacle. These knife-edge bearings or pivots may be of the usual triangular form, slid laterally into correspondingly-shaped lateral sockets $c^6$ on the castings or hangers B', said hangers having on the opposite sides from said sockets bearings or projections $c^7$, ranging above and in alinement with said knife-edge pivots, reinforcing or strengthening these points.

The receptacle B is provided with an upwardly tapered or vanishing valve B², axially hung therein, centrally with relation to its vertical transverse plane upon a shaft or axis $d$, bearing and suitably bushed in the sides of the receptacle, said valve being adapted to play back and forth and extend into the upward extension $b^3$ from the partition or division $b^5$, arranged centrally of said receptacle, thus providing for converting the receptacle into two compartments and the feeding of the grain or material into said compartments alternately. The valve B² and the partition or division $b^5$ are adapted to impart to the respective compartments formed thereby a predetermined measurement, each compartment having a capacity of so many pounds—say equal to a bushel, more or less.

The valve shaft or axis $d$, as before stated, bearing in the sides of the receptacle B, extends beyond said sides of the receptacle and forms the pivots for two centrally-pivoted levers D D' upon opposite sides of said receptacle, connected to the hinged bottoms or gates $b^4$ by rods or connections $e\ e$, pivoted at their lower ends laterally to said gates or bottoms and having their upper ends let into slots $e'$, formed in and opening through the under sides of said levers and receiving pivots $e^2$, passed transversely through said levers and said ends of the rods. The connection between the rods $e$ and the gates or hinged bottoms $b^4$ is effected by projections or studs $e^3$, passed through eyes or apertures in the lower ends of said rods and formed or cast with plates $e^4$, fitted and secured to the lateral edges and under sides of said bottoms or gates. The lever D' has its ends offset or stepped, as at $f$, and may also be slotted, as at $f'$, to receive, preferably, wear-plates of hard metal or steel $f^2$, held in place by screw-bolts $f^3$ to reduce wear or abrasion to the minimum, as will be appreciated farther on.

E E are trips or dogs right-angled in their general construction, with their short vertical portions pivoted or sleeved at their lower ends upon cylindric screw-bolts or pivots $g'$, held to plates or castings $g$, screwed or otherwise secured to the side of the receptacle B and projecting beyond its ends. These vertical portions of said trips or dogs are also provided with offsets or shoulders $h$, preferably of hard metal or steel, for a purpose before herein stated, to engage the plates or projections $f^2$ of the lever D', and thus retain elevated one or the other ends of the latter, as required in the operation of the machine.

The long horizontal arms of the trips or dogs E are upheld and rest upon adjustable stops $i$, preferably in the form of screw-bolts working in screw-threaded eye-ended studs $i'$, screwed or otherwise fastened to the side of the receptacle B, while the free ends of said arms are widened, as at $i^2$, and provided with elongated open-ended slots $i^3$, the purpose of which will appear presently. The widened free end of the long arm of one of the trips or dogs is adapted to be engaged by a pendent stop $k$, depending from the framing A, to limit the upward movement of one trip or dog, the corresponding end of the long arm of the other trip or dog underlapping the aforesaid trip-arm to thus limit its upward movement.

F is the scale or counterpoise beam supported in place by the usual knife-edge pivots $l'$, let into eye-ended projections of a post or support $l$, suitably secured upon the framing A, said beam carrying the usual counterpoise F', also a supplemental counterpoise F² to balance the beam, disposed adjustably thereon, being held upon a horizontal screw $m$, suitably held in an upward extension $m^2$ of said beam. The free end of the scale or counterpoise beam F enters or moves and is supported at its free end in a slotted plate or guide $m'$, fastened upon the framing A. The base of the slot of the plate or guide $m'$ is cushioned with rubber, preferably, to prevent hammering and abrasion of the parts.

The scale or counterpoise beam F has connected thereto the usual knife-edge supported or pivoted rod $n$, in turn having a like connection with the bail or lever C, it may be, as shown, or otherwise. The heel end of the scale or counterpoise beam F is provided with, preferably, an eye-ended extension $o$, having, preferably, an adjustable contacting point $o'$ in the form of a screw-bolt entering the eye of said extension, screw-threaded for that purpose, the object of which will appear hereinafter.

G is an unequal-arm lever, with its fulcrum post or support $p$ secured upon the framing A and one end, preferably cushioned with rubber, extending under the contacting point $o'$ at the heel end of the scale or counterpoise beam F, said lever normally resting near its opposite end upon a stop or post $q$. This latter or opposite end of the lever G has pivoted or connected to it a pendent rod or bar G', adapted to pass through the slots $i^3$ in the widened ends $i^2$ of the trips or dogs E E and headed therebelow or otherwise adapted to enable it as the scale or counterpoise beam acts upon the lever G to pull upward upon or lift the trips or dogs in effecting the tripping of the grain-receptacle-gate-actuating levers D D'.

H is the register, whose inclosing case or closure $r$ is mounted upon a preferably crooked or bent rod or bar $s$, passing loosely through a top bar of the framing A and suitably fixedly held in the lateral outwardly-extending arms $t'$ $t'$, one on each of two brackets or castings $t$ $t$, screwed or otherwise secured to the receptacle B and arranged to correspond to the crooked or bent form of said rod or bar $s$. The upper end of the rod $s$, above the framing top bar, has preferably cast therewith a socket $u$ as a convenient means to receive a pendent stud $u'$ on the register case or closure $r$, said socket having a handled screw $u^2$ working therein and adapted to engage and secure said stud in place and yet permit of the ready removal of the same with the register when required. The rod $s$ also passes through a collar or sleeve $v$, secured upon the top of the framing A, with its upper end or edge contiguous to the lower beveled edge of the socket $u$.

I is a push bar or rod passing through a top piece of the framing A and preferably a slot $w'$ in a plate $w$, secured to said top piece, and having its upper end suitably pivoted or connected to the register, it being let into a slot in said pendant or stud and held therein by a pin or pivot passed transversely therethrough, as usual, among other ways, in making a pivotal connection. The lower end of this push bar or rod has two pendent branches or prongs I' I' resting in annular or circular recesses $x$ $x$ of two lateral outwardly-extending trunnion-like projections or studs K K, preferably each integral with the lever D', engaged by the trips E, whereby as said lever is first tilted one way and then the other in alternately opening and closing the receptacle gates or bottoms said push-bar will be accordingly actuated or pushed upward and thus actuate the register and effect the registration of the weighed grain or flour.

In operation, the scales being properly adjusted, the grain or other material fed into the hopper and thence entering the required compartment or chamber of the receptacle B will, as its weight of course continues to increase as it enters said compartment, finally depress the receptacle, causing the kicking of the scale-beam F, its counterpoised or weighted end rising. The thus-depressed heel-end extension of said beam, having the point $o'$, will engage or strike the shorter arm of the lever G, elevating its opposite arm, in turn elevating the rod or bar G', throwing one of the trips or dogs E E out of engagement with one end of the centrally-pivoted lever D'. This end of the said latter lever being released, the gate or hinged bottom controlled thereby and receiving the accumulated weight of the grain or contents of the compartment will drop and discharge said grain or contents. This action of parts will also swing the said end of the lever D' downward, thus turning the valve-shaft $d$ and accordingly shifting the valve B² to provide for the feeding of the grain or material into the opposite compartment of the receptacle B. The opposite end of the lever D' having been thus elevated and engaged by the trip E on that side, the corresponding gate will be lifted, thus closing the bottom of the compartment thereabove and permitting the continuous feeding of the grain or other material, as is obvious.

It will be seen that with the downward movement of the end of the lever D', opening the gate of the receptacle-compartment in discharging the contents of the latter, the prong or branch I' of the push-bar I on that side will be struck by the engaging pin or stud K on the lever D', and thus push or actuate said bar, operating the register H, and accordingly effect the registration of the weighed grain or contents of the said compartment. A like operation of the corresponding parts of the opposite side of the machine will result and its compartment in like manner be supplied with the grain or material and its contents discharged, this action of parts being kept up alternately as long as the machine is in use.

Among other advantages of my invention it is stated that it is simple in construction and operation, inexpensive of manufacture, is direct and positive in action, accurate in weighing, automatic in operation, and provides for the alternate filling and discharging of the grain-weighing compartments or chambers, and consequently the continuous feeding of the grain or material thereto.

Having thus fully described my invention, what I claim, and desire to secure by Letters Patent, is—

1. In grain-scales, the combination of a grain-receptacle, a counterpoise, or scale, beam, substantially bail-shaped, and lateral, bars or levers connected to said counterpoise, or scale, beam, and interconnected or linked together and adapted to support said grain-receptacle at opposite sides, a valve to alternately open and close the upper ends of compartments of said receptacle, a lever fixed to a shaft carrying said valve, gates to alternately open and shut the lower ends of said compartments and connected to said lever, offset trips or dogs to alternately engage and uphold said lever, and mechanism between said counterpoise, or scale, beam and said trips or dogs substantially as set forth.

2. In grain-scales, the combination of a grain-receptacle, a counterpoise, or scale, beam, substantially bail-shaped, and lateral, bars or levers connected to said counterpoise, or scale, beam, and interconnected by knife-edge-supported links, said grain-receptacle knife-edge supported at opposite sides upon said levers or bars, respectively, a valve to alternately open and close the upper ends of compartments of said receptacle, a lever fixed to a shaft carrying said valve, gates to alternately open and close the lower ends of said compartments and connected to said lever, offset trips or dogs to alternately engage and uphold said lever, and mechanism between said counterpoise, or scale, beam and said trips or dogs, substantially as set forth.

3. In grain-scales, the combination, with a grain-receptacle, pivoted bar or lever support therefor, and a counterpoise, or scale, beam, connected to said support, of a valve adapted to alternately open and close the upper ends of compartments of said receptacle, a lever fixed to a shaft carrying said valve, gates adapted to alternately open and close the lower ends of said compartments and connected to said lever, trips or dogs pivoted to said receptacle and having offsets or shoulders upon their vertical portions adapted to alternately engage and uphold the ends of said lever, and intermediary lever and lifting rod or bar mechanism, between said counterpoise, or scale, beam, and trips or dogs, substantially as set forth.

4. In grain-scales, the combination, with a grain-receptacle, pivoted bar or lever support therefor, and a counterpoise, or scale, beam, connected to said support, of a valve adapted to alternately open and close the upper ends of compartments of said receptacle, a lever fixed to a shaft carrying said valve, and having offset or stepped ends, gates adapted to alternately open and close the lower ends of said compartments and connected to said lever, the right-angled trips or dogs pivoted to said receptacle and having offsets or shoulders upon their vertical portions, adapted to alternately engage and uphold the offset or stepped ends of said lever, and intermediary lever and lifting bar or rod mechanism, interposed between said counterpoise, or scale, beam and said trips or dogs, substantially as set forth.

5. In grain-scales, the combination, with a grain-receptacle, knife-edge supported, substantially bail-shaped and lateral levers or bars pivotally interconnected and adapted to support said receptacle at opposite sides, respectively, and a counterpoise, or scale, beam, of the valve adapted to alternately open and close the upper ends of compartments of said receptacle, the lever fixed to a shaft carrying said valve, gates adapted to alternately open and close the lower ends of said compartments, and connected to said lever, the trips or dogs pivoted to said receptacle and having shoulders or offsets upon their vertical portions adapted to alternately engage and uphold the ends of said lever, and intermediary lever and lifting bar or rod mechanism, interposed between said counterpoise, or scale, beam and said trips or dogs, substantially as set forth.

6. In grain-scales, the combination of a grain-receptacle, a counterpoise, or scale, beam, and a pivoted bar or lever support for said receptacle, connected to said beam, a valve adapted to alternately open and close the upper ends of the compartments of said receptacle, a lever fixed to the shaft carrying said valve, the right-angled trips or dogs pivoted to said receptacle and having shoulders or offsets upon their vertical portions, adapted to alternately engage and uphold the ends of said lever, the gates adapted to alternately open and close the lower ends of said compartments and having rod connections with said lever, the uneven-arm lever with one end adapted to be engaged by the heel end of said counterpoise, or scale, beam, and having connected to its opposite end a lifting bar or rod, reaching down through the slotted free ends of said trips or dogs, with its lower end adapted to act upon the under side of the underlapping end of said trips, substantially as specified.

7. In grain-scales, the combination of a grain-receptacle, having a valve for alternately controlling the feeding of the grain or material to its compartments, and gates for similarly controlling the discharge of the contents of said compartments, mechanism adapted to combine with said valve and gates to carry out these ends, a register suitably supported from said receptacle, and the push bar or rod adapted to actuate said register, and having prongs or branches at its lower end, adapted to engage or ride upon lateral studs or pins projecting from the valve-actuating lever, substantially as set forth.

8. In grain-scales, the combination of a grain-receptacle having a valve for alternately controlling the feeding of the grain or material to its compartments, and gates for similarly controlling the discharge of the contents of said compartments, mechanism adapted to combine with said valve and gates to carry out these ends, a register suitably supported from said receptacle, the push bar or rod adapted to actuate said register and having prongs or branches at its lower end, and lateral pins or studs projecting from the valve-actuating lever, and having annular or circular recesses to receive said branches or prongs, substantially as specified.

9. In grain-scales, the combination of a grain-receptacle and its flexible or yielding supporting mechanism, of the register, supported from said receptacle, the support therefor consisting of the crooked or bent rod or bar having at its upper end a handled screw-provided socket, adapted to receive a pendent stud upon the register case or closure, and lateral brackets or castings, secured to said receptacle and holding said rod or bar, substantially as set forth.

In testimony whereof I affix my signature in presence of two witnesses.

JULIAN DORIOT.

Witnesses:
J. F. H. MOTHERSHEAD,
JOS. R. EDSON.